United States Patent
Lenz

(10) Patent No.: US 10,371,275 B2
(45) Date of Patent: Aug. 6, 2019

(54) ACTUATOR HAVING ELECTRIC DRIVE FOR ACTUATING A VALVE DEVICE

(71) Applicant: ONESUBSEA IP UK LIMITED, London (GB)

(72) Inventor: Norbert Lenz, Celle (DE)

(73) Assignee: ONESUBSEA IP UK LIMITED, London (GB)

( * ) Notice: Subject to any disclaimer, the term of this patent is extended or adjusted under 35 U.S.C. 154(b) by 183 days.

(21) Appl. No.: 15/513,485

(22) PCT Filed: Oct. 10, 2014

(86) PCT No.: PCT/EP2014/002750
§ 371 (c)(1),
(2) Date: Mar. 22, 2017

(87) PCT Pub. No.: WO2016/055080
PCT Pub. Date: Apr. 14, 2016

(65) Prior Publication Data
US 2017/0248247 A1    Aug. 31, 2017

(51) Int. Cl.
*F16K 31/04* (2006.01)
*F16H 25/22* (2006.01)
(Continued)

(52) U.S. Cl.
CPC ......... *F16K 31/04* (2013.01); *F16H 25/2252* (2013.01); *F16K 31/504* (2013.01);
(Continued)

(58) Field of Classification Search
CPC ........ F16K 31/04; F16K 31/504; F16K 31/44; F16K 31/50; H02K 16/04; H02K 7/06; F16H 25/2252; F16H 2025/2078
(Continued)

(56) References Cited

U.S. PATENT DOCUMENTS 4,723,754 A * 2/1988 Torimoto ................ F16K 31/04
                                                              251/129.05
4,770,390 A * 9/1988 Tratz ..................... F16K 31/048
                                                              251/129.11
(Continued)

FOREIGN PATENT DOCUMENTS

WO    2004020785 A1    3/2004
WO    2009015676 A1    2/2009
(Continued)

OTHER PUBLICATIONS

International Search Report issued in International Patent Application No. PCT/EP2014/002750 dated Jul. 8, 2015; 3 pages.
(Continued)

*Primary Examiner* — John Bastianelli
(74) *Attorney, Agent, or Firm* — Brandon S. Clark

(57) ABSTRACT

Actuator for actuating a valve device comprising an electric drive (14) being operatively engaged to an actuating element (1) of the valve device, the electric drive (14) comprising at least one torque motor (2) which drives a hollow shaft (3) as an internal rotor, that positions a threaded drive (4) having a screw nut (6) and a threaded spindle (5) for converting the rotational movement of the hollow shaft (3) into a translational movement of the threaded spindle (5), and the threaded spindle (5) acts upon the actuating element (1) for displacing the same, wherein the threaded drive (4) comprises an inverted roller screw (4.1), and the screw nut (6) of the inverted roller screw (4.1) houses the threaded spindle (5) as a push rod.

17 Claims, 1 Drawing Sheet

(51) Int. Cl.
*F16K 31/50* (2006.01)
*H02K 16/04* (2006.01)
*F16H 25/20* (2006.01)
*F16K 31/44* (2006.01)
*H02K 7/06* (2006.01)

(52) U.S. Cl.
CPC ..... *H02K 16/04* (2013.01); *F16H 2025/2078* (2013.01); *F16K 31/44* (2013.01); *F16K 31/50* (2013.01); *H02K 7/06* (2013.01)

(58) Field of Classification Search
USPC ............... 251/129.11–129.13, 267–269, 273
See application file for complete search history.

(56) References Cited

U.S. PATENT DOCUMENTS

| | | | | |
|---|---|---|---|---|
| 5,567,998 | A * | 10/1996 | Ineson | F16C 33/08 310/260 |
| 5,620,166 | A * | 4/1997 | Lord | F16K 31/04 251/129.12 |
| 6,674,208 | B2 * | 1/2004 | Ineson | H02K 1/145 310/190 |
| 6,802,488 | B1 * | 10/2004 | Patterson | F16K 1/123 251/129.11 |
| 7,608,952 | B2 * | 10/2009 | Weldon | F16N 15/00 310/80 |
| 7,856,900 | B2 | 12/2010 | Benoit et al. | |
| 7,900,888 | B2 * | 3/2011 | Weldon | F16K 31/04 251/129.11 |
| 8,297,315 | B2 | 10/2012 | Esveldt | |
| 2002/0096945 | A1 | 7/2002 | Dugas et al. | |
| 2006/0101929 | A1 * | 5/2006 | Benoit | F16H 25/2015 74/84 R |
| 2008/0078644 | A1 * | 4/2008 | Weule | F16D 28/00 192/141 |
| 2010/0025608 | A1 * | 2/2010 | Esveldt | F16K 1/12 251/205 |
| 2010/0206103 | A1 * | 8/2010 | Duits | F16H 25/20 74/89.34 |
| 2012/0153198 | A1 * | 6/2012 | Biester | E21B 33/0355 251/129.12 |

FOREIGN PATENT DOCUMENTS

| | | |
|---|---|---|
| WO | 2011006519 A1 | 1/2011 |
| WO | 2014037023 A1 | 3/2014 |

OTHER PUBLICATIONS

Written Opinion issued in International Patent Application No. PCT/EP2014/002750 dated Jul. 8, 2015; 5 pages.

* cited by examiner

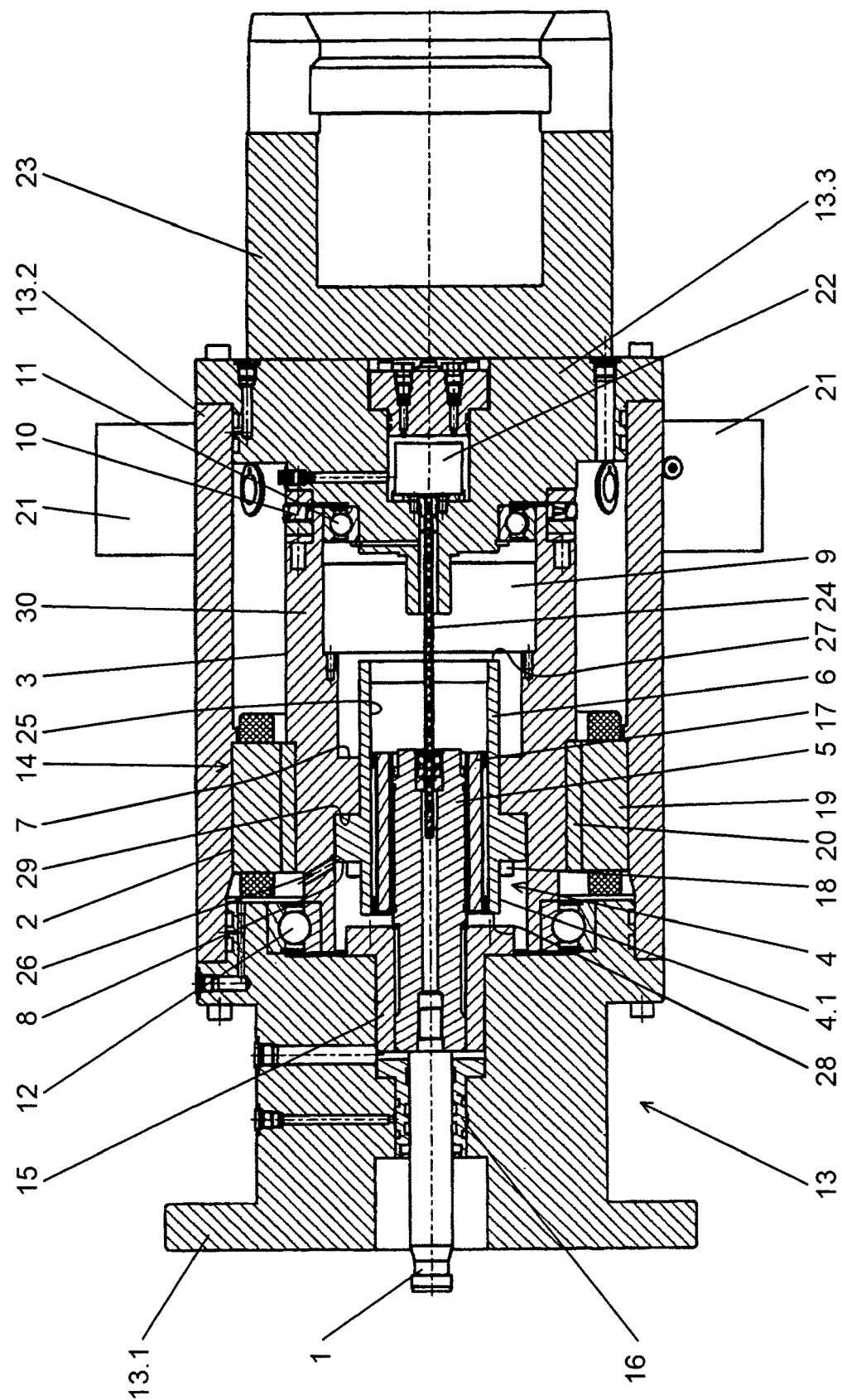

ACTUATOR HAVING ELECTRIC DRIVE FOR ACTUATING A VALVE DEVICE

The invention relates to an actuator for actuating a valve device, more particularly to an actuator for actuating a valve device comprising an electric drive.

From WO 2011/006519 A1 an actuator for actuating a valve device is known, which has an electric drive in the form of a torque motor. By means of the torque motor a thread drive is displaceable, which comprises a threaded spindle and a screw nut. To this end the torque motor drives a hollow shaft that holds a shaft insert which can be decoupled. The shaft insert is connected to the screw nut in a motion-transmitting manner. The decoupling is carried out by a safety clutch that shall prevent the torque transmitted from the torque motor to the screw nut to exceed a maximum value. Damages to the valve device are thereby minimized. This safety function, however, brings about a mechanically involved design of the actuator, by which also maintenance efforts are increased.

From WO 2004/020785 A1 a drive device for adjusting an operating element for a valve in the field of gas and oil production is known. A plurality of relatively small driving motors can be employed, wherein a double helical gearing reduces the structural volume of the drive device. In order to avoid that the drive device permits an automatic adjustment of the operating element in case of a failure of the driving motors the double helical gearing can be designed self-locking. Moreover, a corresponding brake or self-locking extent is even higher with the double helical gearing than with the worm gear pair.

In view of WO 2011/006519 A1, in some embodiments of the present proposal, it is proposed to provide an actuator for actuating a valve device, which allows for high adjustment speeds and yet is of simple and compact design.

As such, an actuator for actuating a valve device is proposed comprising an electric drive being operatively engaged to an actuating element of the valve device, the electric drive comprising at least one torque motor which drives a hollow shaft as an internal rotor, that positions a threaded drive having a screw nut and a threaded spindle for converting the rotational movement of the hollow shaft into a translational movement of the threaded spindle, and the threaded spindle acts upon the actuating element for displacing the same, characterized in that the threaded drive comprises an inverted roller screw, and the screw nut of the inverted roller screw houses the threaded spindle as a push rod.

As such, it is proposed an actuator for actuating a valve device, which achieves high adjustment speeds by employing no gear unit on the one hand and employing an inverted roller screw as a linear drive on the other hand. In some embodiments, the actuator therefore might not only provide high adjustment speeds, but might also be constructed with only few parts, for which reason the probability of failure is low and might imply low costs.

In some embodiments, the inverted roller screw might be driven directly such that high adjustment speeds might be achieved at, compared to gear units, lower rotational speeds of the torque motor. Enabling the operation of the actuator at low rotational speeds of the torque motor is advantageous in embodiments wherein the actuator is filled with oil as lower rotational speeds of the torque motor might enable less power losses (churning losses).

Advantageously, in some embodiments, the hollow shaft might be driven as an internal rotor of the torque motor and thus form a transmission element, which shall ensure a reliable transmission of the driving torque to the screw nut of the threaded drive. In embodiments, the design of the hollow shaft might also influence its functionality. For example, the design of the hollow shaft might comprise the positioning of the hollow shaft with respect to the torque motor and the inverted roller screw and/or the shaft's structural shape.

In some embodiments, the hollow shaft supports the screw nut by surrounding the screw nut coaxially adjacent to the torque motor. The inverted roller screw thereby might be positioned in a load transferring manner, such that high axial loads acting onto the actuating element might not disturb the functionality of the inverted roller screw. The positioning of the hollow shaft with respect to the torque motor and to the screw nut might enable the driving torque of the torque motor to be transmitted in a generally radial direction to the screw nut, whereby the axial torsional stress of the hollow shaft can be reduced. In some embodiments, the hollow shaft provides a sleeve-like perimeter wall, which allows for a vault-like dissipation of axial loads of the actuating element. Axial loads acting centrally onto the threaded spindle might be applied to the perimeter wall of the hollow shaft which surrounds the screw nut via the screw nut. The loads might then be transferred by the perimeter wall of the hollow shaft and supported in an axial mounting of the hollow shaft. By this design the perimeter of the perimeter wall can be larger than an outer perimeter of the screw nut. By transferring the axial loads to components of larger perimeter, an increase in the effective area of the load transfer might be achieved, such that local component stresses can be reduced.

In some embodiments the thread leads of the inverted roller screw can be chosen such that in comparison to other thread drives small thread leads are formed. The reduced thread lead of the inverted roller screw results in a positioning of the actuating element with an increased accuracy. In addition the required driving torque is reduced, whereby a displacement of the actuating element in particular against high axial loads is improved.

A self-locking solution can be achieved for the actuator by adjusting the thread lead accordingly. To this end in one embodiment, the inverted roller screw has threads with a helix angle that is in the range from 0.2° to 1.0°, in particular in the range from 0.5° to 0.7°. The actuator thus shows a "Fail as is" behavior. This means that in case of a failure of the power supply of the electrical drive the actuator remains in a previously approached position even when being subject to axial loads. An additional holding power might not be required. A separate braking device, as for example a magnetic holding brake, might not be needed as well, such that a particularly compact structure of the actuator is achieved. However, in some embodiments, as a redundant braking system, an additional braking device can be integrated into the actuator, whereby the safety of the actuator is further enhanced.

Advantageously, in the region of the torque motor the hollow shaft is designed with a wall thickness, which amounts to at least one third of the diameter of the threaded spindle. The torque motor applies a tangential driving force to the outside of the hollow shaft which transmits a driving torque to the enclosed screw nut. The hollow shaft thus forms a lever length between the torque motor and the screw nut. The leverage effect of the lever length increases with increasing wall thickness of the hollow shaft. By means of the lever length the driving torque transmitted to the screw nut is increased by the leverage effect.

The screw nut can have at least one bushing-shaped section, which might extend at a distance from the hollow shaft. The at least one bushing-shaped section can then be arranged in a detached manner in an interior region of the hollow shaft. Thereby heat produced in threads of the threaded drive during a displacement of the threaded spindle might be dissipated more effectively. If in some embodiments, in addition, the housing is filled with a fluid, for example with an oil, the displacement of the threaded spindle generates a flow of the fluid about the screw nut, such that heat dissipation is might be further improved by convection.

By means of the fluid an internal housing pressure might be adjusted depending on an external housing pressure of a surrounding space. In an embodiment for the oil and gas industry the surrounding space can be a surrounding fluid. Thereby gaskets and the housing are released of pressure loads, such that the actuator can also be employed at high ambient pressures, as for example in subsea applications. In some embodiments, the hollow shaft is permeated by at least one fluid passage which provides a flow connection between an interior region surrounded by the hollow shaft and exterior region surrounding the hollow shaft in the housing. By means of the flow connection, the pressure equalization within the housing, in particular during a displacement of the threaded spindle, might be improved, such that a more uniform internal housing pressure can be reached.

The screw nut can have an outer collar, which is supported on an inner collar of the hollow shaft. Axial loads of the actuating element can then be transferred as pressure loads via the outer collar and a supporting surface formed on the inner collar to the hollow shaft. Advantageously the screw nut is connected friction-locked and/or form-locked to the hollow shaft, whereby the reliability of the transmission of axial pressure and tensile loads of the actuating element to the hollow shaft as well as of the transmission of the driving torque to the screw nut is enhanced.

The hollow shaft can surround the screw nut over its entire axial extent. This allows for a particularly compact structure of the actuator.

Further advantages and embodiments of the invention can be learnt from the subsequent specification and the dependent claims.

Subsequently the invention is explained in more detail with reference to the embodiment illustrated in the accompanying FIGURE.

FIG. 1 shows schematically a cross-section of an actuator according to the invention.

The present proposal relates to an actuator for actuating a valve device. In embodiments of the present proposal the actuator for actuating a valve device can be used for the oil and gas industry.

The actuator is provided for actuating valve devices using an actuating element 1 (FIG. 1). The actuating element 1 can be a valve stem of the valve device. In the embodiment for the oil and gas industry the valve device can be in particular a choke device (choke valve) for an oil or gas pipe. By displacing the actuating element 1 in an essentially axial direction the valve device is displaced in order to regulate the amount of a conveyed fluid, like an oil or gas flow, flowing through the valve device.

In embodiments of the present proposal according to FIG. 1 the actuator can have a housing 13 and comprises an electric drive 14 being operatively engaged to an actuating element 1 of the valve device. The electric drive 14 comprises at least one torque motor 2 which drives a hollow shaft 3 as an internal rotor. The hollow shaft 3 can be supported radially and axially in the housing 13 and positions a threaded drive 4 having a screw nut 6 and a threaded spindle 5 for converting the rotational movement of the hollow shaft 3 into a translational movement of the threaded spindle 5. The threaded spindle 5 acts upon the actuating element 1 for displacing the same. The hollow shaft 3 can surround the screw nut 6 over at least a length coaxially adjacent to the torque motor 2 in a supporting manner. The threaded drive 4 comprises an inverted roller screw 4.1 and the screw nut 6 of the inverted roller screw 4.1 houses the threaded spindle 5 as a push rod. The screw nut 6 can house the threaded spindle 5 by means of a roller set 17. The screw nut (6) thereby can form a guide for the roller set 17, wherein the axial extent of the screw nut 6 gives an adjustment range for the actuating element 1.

The threaded drive 4 is designed as an inverted roller screw 4.1. In the inverted roller screw 4.1 a roller set 17 is attached to the threaded spindle 5 as shown in FIG. 1. The threaded spindle 5 is displaceable within the axial extent of the screw nut 6 by rotating the screw nut 6. To this end a thread 25 is located on an inner surface of the screw nut 6, with which the individual rollers of the roller set 17 are in mesh. The rollers of the roller set 17 further mesh with an external thread of the threaded spindle 5. The thread engagement of the threaded spindle 5 with the screw nut 6 via the roller set 17 permits a displacement of the threaded spindle 5 by rotating the screw nut 6 as well as a transfer of axial loads of the actuating element 1 via the threaded spindle 5 onto the screw nut 6. Inverted roller screws can be designed with particularly small threads while exhibiting no backlash and low friction coefficients at the same time. The thread 25 of the inverted roller screw 4.1 advantageously has a thread lead in the range from 0.5 mm to 5 mm. Thereby the position of the threaded spindle 5 is adjustable with a particularly high accuracy. In addition a small thread lead permits a displacement of the actuating element 1 against high axial pressure loads, since the driving torque required for displacing decreases with a decrease of the thread lead. Axial pressure loads act onto the actuating element 1 depending on the pressure of the conveyed fluid.

The choice of the thread lead and the nominal rotational speed of the torque motor 2 determine the adjustment speed attainable by the actuating element 1. The at least one torque motor 2 advantageously has a nominal rotational speed in the range from 50 rpm to 300 rpm. The adjustment speed could therefore be chosen in the range from 25 mm/min to 1500 mm/min. In particular, the adjustment speed of the actuating element 1 can be in the range from 200 mm/min to 500 mm/min.

A helix angle of the thread 25 is determined by the ratio of the lead of the thread 25 to the inner diameter of the screw nut 6. The smaller the helix angle of the thread 25 is chosen, the smaller is the backdriving torque of the screw nut 6 at a given axial load of the actuating element 1. For helix angles of the thread 25 below a threshold helix angle the actuator can advantageously be designed self-locking. The threshold helix angle inter alia depends on the magnitude of the friction coefficients caused for example by bearings, gaskets and/or the inverted roller screw 4.1 itself. In particular, the actuator can be self-locking if the inverted roller screw 4.1 has an indirect efficiency, which is smaller than or equal to zero. Advantageously the inverted roller screw 4.1 has a thread 25 with a helix angle, which is in the range from 0.2° to 1.0°, in particular in the range from 0.5° to 0.7°. In this range a self-locking of the actuator can be achieved. Hence, other means for achieving a self-locking of the actuator, as for example a worm gear or a clamping gear or double helical gearing can be dispensed with.

The threaded spindle 5 acts onto the actuating element 1, such that the actuating element 1 follows an axial displacement of the threaded spindle 5 and transfers axial loads of the actuating element 1 to the threaded spindle 5. In order to inhibit a concurrent rotation of the threaded spindle 5 during a rotation of the screw nut 6 and a displacement of the actuating element 1 by a rotation of the threaded spindle 5 while the screw nut 6 stands still, the threaded spindle 5 is engaged to a rotation locking device 15. For example, the engagement can be a spline joint, wherein the threaded spindle 5 forms a spline shaft passing through the rotation locking device 15 which is designed as a corresponding spline sleeve. In addition, the threaded spindle 5 is guided axially by the rotation locking device 15. The rotation locking device 15 is mounted on the housing 13, advantageously on a front part 13.1 of the housing that faces the actuating element 1. The actuating element 1 to be displaced by the threaded spindle 5 is guided with a guide bushing 16 through an opening of the housing, which can be located in the front part 13.1 of the housing. The guide bushing 16 is sealed with respect to the actuating element 1 and the housing 13.

The inverted roller screw 4.1 is driven by means of the electrical drive 14, which comprises the at least one torque motor 2. The at least one torque motor 2 has a stator 19, which is mounted on the inside of an exterior housing wall 13.2 of the housing 13, and a rotor 20, which is provided on the outside of the hollow shaft 3. By arranging the rotor 20 on the hollow shaft 3 the hollow shaft 3 forms an internal rotor of the torque motor 2.

Advantageously the electrical drive 14 is designed redundantly. To this end at least two winding systems being controllable independently from one another can be provided within the torque motor 2. The winding systems each can be connectable via separate electrical connectors 21 with an external control unit (not shown). According to an embodiment not illustrated the redundancy of the electrical drive can also be achieved by arranging two separate torque motors along the axial extent of the hollow shaft.

By means of the positioning of the stator 19 of the torque motor 2 with respect to the hollow shaft 3 that is provided with the rotor 20 the driving force of the torque motor 2 acts tangentially on the outside of the hollow shaft 3 and is transferred as a driving torque to the internally positioned screw nut 6. Thus, the screw nut 6 is driven gearless and directly via the hollow shaft 3. Due to the gear-less direct drive of the screw nut 6 high adjustment speeds of the actuating element 1 can be achieved at low rotational speeds of the torque motor 2 compared to using an engine-transmission unit. In addition, the efficiency of the electrical drive 14 might be enhanced by reduced power losses like gearbox losses and/or churning losses.

The hollow shaft 3 mounts the screw nut 6 at a fixed position. Advantageously the hollow shaft 3 is designed essentially sleeve-like with a perimeter wall 30 and coaxially houses the screw nut 6 at least partially in an interior region. Thereby, besides the transmission of the driving torque by the hollow shaft 3, a vault-like transfer of axial loads of the actuating element 1 can be achieved. Axial loads of the actuating element 1 can be transferred via the threaded spindle 5 and the screw nut 6 to the inside of the hollow shaft 3, which can carry off the load via its sleeve-like perimeter wall 30. For the transfer of axial loads onto the hollow shaft 3 the screw nut 6 advantageously has an outer collar 8, which is supported on an inner collar 7 of the hollow shaft 3. In the embodiment shown in FIG. 1 the outer collar 8 forms a flange being rectangular in cross-section, which bears on a counterflange 29 being formed by the inner collar 7. The inner collar 7 therefore provides an annular supporting surface, via which the axial loads can be transferred to the hollow shaft 3 as pressure loads.

According to a different embodiment not illustrated the outer collar can also have a cross-section that is shaped triangular or trapezoidal. On an inner collar designed as a corresponding counterpart the supporting surface then is shaped conically. In this case the support of the screw nut in the hollow shaft can be self-centering. The aperture angle of the conical supporting surface then determines the direction, in which the pressure loads from the screw nut are transferred to the hollow shaft.

Advantageously the screw nut 6 is connected force-locking and/or form-locking to the hollow shaft 3. For a force-locking connection fixing means 18, like screws for example, can be provided. A form-locking connection can be achieved, for example, by a toothing of the screw nut 6 and the hollow shaft 3, in particular of the outer collar 8 and the inner collar 7.

The screw nut 6 can be surrounded by the hollow shaft 3 over at least a length that can be situated coaxially adjacent to the torque motor 2. The application of the driving force of the torque motor 2 to the hollow shaft 3 and the transmission of the driving torque onto the screw nut 6 therefore advantageously take place axially adjacent to each other. Due to this positioning of the screw nut 6 with respect to the torque motor 2 by the hollow shaft 3 a transmission of the driving torque by the hollow shaft 3 in an essentially radial direction can be achieved. Thereby the torsional stiffness of the drive and the acceleration values of the screw nut 6 attainable with the torque motor 2 can be enhanced. Advantageously the length over which the hollow shaft 3 surrounds the screw nut 6 is an axial extent which is greater than or equal to the axial extent of the screw nut 6. In the embodiment according to FIG. 1 the length is greater than the axial extent of the screw nut 6, such that the hollow shaft 3 houses the screw nut 6 over its total axial extent in an interior region of the hollow shaft 3. In alternative embodiments not illustrated the screw nut is arranged such that it protrudes from the hollow shaft or is flush with the hollow shaft on at least one side.

The hollow shaft 3 is mounted rotatably in the housing 13 with bearings 10, 11, 12. The bearings can be designed as rolling-element bearings. The mounting of the hollow shaft 3 therein may be designed for sustaining radial as well as axial loads. Advantageously the bearings 10, 11, 12 support the hollow shaft 3 with respect to the front part 13.1 of the housing and an oppositely arranged rear part 13.3 of the housing. The bearings 10, 11, 12 can be located at end portions of the axial extent of the hollow shaft 3. The front bearing 12 can be designed in particular as an angular ball bearing. Besides for the radial support of the hollow shaft 3 it is provided for absorbing axial tensile loads. Other types of bearings that are able to sustain radial as well as axial forces, such as spherical roller bearings for example, can also be used as a front mounting. Advantageously the hollow shaft 3 is supported at its rear end portion in the housing 13 by a combination of an axial bearing 10 and a radial bearing 11. The axial bearing 10 is designed to sustain the high axial pressure loads acting onto the actuating element 1, which can amount to up to 150 kN, for example. The radial forces are sustained by the radial bearing 11 and are transferred separately from the axial loads to the housing 13. By the combined use of the radial bearing 11 and the axial bearing 10 the bearings can be chosen separately adapted to the loads acting in the radial and axial directions. Alternatively, a single bearing can be used, which sustains radial as well as axial loads, as for example an angular ball bearing or a spherical roller bearing.

Advantageously the hollow shaft 3 has a wall thickness in the zone of engagement with the torque motor 2 which amounts to at least one third of the diameter of the threaded spindle 5. For example, the wall thickness of the hollow shaft 3 can be at least as large as the wall thickness of the exterior housing wall 13.2. The hollow shaft 3 then forms a lever length between the torque motor 2 and the screw nut 6. The driving force of the torque motor 2 is therefore applied to a lever arm which is prolonged by the lever length defined by the wall thickness of the hollow shaft 3.

Thereby, a leverage effect can be obtained by which the driving torque transmitted to the screw nut 6 can be enhanced. At a constant driving force of the torque motor 2 the driving torque transmitted to the screw nut 6 increases with an increasing wall thickness of the hollow shaft 3. Said wall thickness of the hollow shaft 3 can vary along its axial extent, wherein said wall thickness is a minimum wall thickness in the region of the torque motor 2.

The housing 13 can be filled with a fluid for adjusting an internal housing pressure which is adjustable according to an external housing pressure. The external housing pressure can be determined by ambient pressures as are present in subsea applications for example. The internal housing pressure and the pressure of the conveyed fluid determine the axial load of the actuating element 1. Depending on the pressure of the conveyed fluid an axial pressure load acts onto the actuating element 1, which can amount to up to 150 kN in the oil and gas industry. At ambient pressures as are present in said subsea applications and low pressures of the conveyed fluid axial tensile loads of the actuating element 1 can occur, that are to be sustained by the actuator.

Advantageously, the pressurization of the housing fluid is carried out by means of a pressure compensator (not shown). The pressure compensator can be part of the actuator or can be mounted externally to the actuator. Due to the pressure compensation the actuator can be suited for use at the bottom of the ocean, in particular. Advantageously, for an equalization of the internal housing pressure the hollow shaft 3 is permeated by at least one fluid passage 26, which forms a flow connection between an exterior and an interior region of the hollow shaft 3 in the housing 13. By a distributed arrangement of several fluid passages a circulation of the housing fluid during displacement of the actuating element 1 can be induced. The housing fluid can be provided at the same time also for lubrication and cooling. In particular an oil can be used for the housing fluid.

The screw nut 6 can have at least one bushing-shaped section 27, 28 which extends at a distance from the hollow shaft 3. According to FIG. 1 a front bushing-shaped section 28 and a rear bushing-shaped section 27 is provided, between which the screw nut 6 is supported on the hollow shaft 3. Due to the distance to the hollow shaft 3 heat being generated in the thread 25 of the inverted roller screw 4.1 during displacement of the actuating element 1 might be dissipated at an inner and an outer side of the bushing-shaped sections 27, 28 to the environment, in particular to the housing fluid. In addition, the displacement of the threaded spindle 5 can produce a flow of the housing fluid, which flows about the screw nut 6. Thereby a convective dissipation of heat can be achieved.

Advantageously an installation space 9 is assigned to the hollow shaft 3 for housing a braking device being supported on the housing 13, which can be provided for a temporary locking of the hollow shaft 3. The braking device can be a magnetic holding brake, as is known from WO 2014/037023 A1, for example. By an activated braking device mounted into the installation space 9 the rotational movement of the hollow shaft 3 can be inhibited, so that the actuator remains in the previously adjusted position even in case of a failure of the electrical drive 14 and when being subject to axial loads. The braking device therefore provides a backstop for the actuator. If the actuator is designed self-locking, the braking device can be provided as a redundant braking system for additional safety.

The actuator can further have a sensor 22, with which the position of the threaded spindle 5 and/or of the actuating element 1 is determinable. To this end the sensor 22 can be arranged axially centered at the rear part 13.3 of the housing and comprise, for example, an axially extending sensor element 24 that extends into the threaded spindle 5 and determines its position directly at the threaded spindle 5.

For maintenance and/or for replacement the actuator can have an interface 23 that is mounted externally on the housing 13, for example on the rear part 13.3 of the housing. Maintenance and/or replacement of the actuator can be carried out remotely-controlled by means of a remotely operated vehicle (ROV).

Although the preceding description has been described herein with reference to particular means, materials and embodiments, it is not intended to be limited to the particulars disclosed herein; rather, it extends to all functionally equivalent structures, methods and uses, such as are within the scope of the appended claims.

The invention claimed is:

1. A method, comprising:
   providing a torque motor with an internal rotor having a hollow shaft;
   securing a screw nut with the hollow shaft such that a thread of the screw nut is oriented in a radially inward direction;
   positioning a threaded spindle within the screw nut and in operational engagement with the screw nut such that rotation of the thread via rotation of the screw nut by the hollow shaft causes linear movement of the threaded spindle;
   locating at least one passage laterally through a wall of the hollow shaft to enable communication of fluid between an interior and an exterior of the hollow shaft; and
   coupling the threaded spindle to a linear actuating element.

2. The method as recited in claim 1, further comprising connecting the linear actuating element to a valve and operating the torque motor to rotate the screw nut so as to cause linear movement of the linear actuator element.

3. The method as recited in claim 2, further comprising countering axial loading on the linear actuating element via engagement of an outer collar of the screw nut and an inner collar of the hollow shaft.

4. A device for actuating a valve, comprising:
   an actuator engageable with the valve via an actuating element, the actuator having:
   an electric drive comprising at least one torque motor;
   a hollow shaft within the torque motor and directly driven by the torque motor for movement in a rotational manner; and
   a threaded drive which is driven directly by the hollow shaft, the threaded drive comprising a screw nut having an internal thread; and a threaded spindle coupled to the actuating element and movably engaged with the screw nut such that rotation of the screw nut via the electric drive causes the threaded spindle to move linearly which, in turn, moves the actuating element linearly, wherein the hollow shaft is supported radially and axially in an actuator housing for rotation with respect to the actuator housing via the torque motor and further wherein the actuator housing may be filled with a fluid for adjusting internal housing pressure relative to external housing pressure, the hollow shaft having a fluid passage therethrough which allows communication of the fluid between an interior and an exterior of the hollow shaft.

5. The device as recited in claim 4, wherein the hollow shaft is formed with a wall having a thickness, in a zone of engagement with the torque motor, of at least one third the diameter of the threaded spindle.

6. The device as recited in claim 4, wherein the internal thread of the screw nut is selected to provide self-locking of the actuator.

7. The device as recited in claim 4, wherein the hollow shaft surrounds the screw nut along an axial extent of the hollow shaft, the axial extent being at least as great as the length of the screw nut.

8. The device as recited in claim 4, wherein a locking connector is formed between the screw nut and the hollow shaft to ensure the screw nut rotates with the hollow shaft.

9. The device as recited in claim 4, wherein the threaded spindle is movably engaged with the screw nut via a roller set.

10. A system, comprising:
an actuator having an actuating element linearly movable between actuating positions, the actuator comprising:
a torque motor having a stator and a rotor;
a hollow shaft, the rotor being arranged on the hollow shaft to form a combined internal rotor of the torque motor;
a screw nut disposed within the hollow shaft and rotatably driven by the hollow shaft, the screw nut having an outer collar engaged with an inner collar of the hollow shaft to counter axial loading on the screw nut, the outer collar further being rotationally locked to the inner collar;
a threaded spindle coupled to the actuating element and movably engaged with the screw nut such that rotation of the screw nut via the torque motor causes the threaded spindle to move linearly which, in turn, moves the actuating element linearly and
wherein the hollow shaft having a fluid passage therethrough which allows communication of the fluid between an interior and an exterior of the hollow shaft.

11. The system as recited in claim 10, wherein the actuator element is configured for coupling to a valve.

12. The system as recited in claim 10, wherein the outer collar and the inner collar are locked to each other in a rotational direction.

13. The system as recited in claim 10, wherein the screw nut has an internal thread by which the screw nut is coupled with the threaded spindle.

14. The system as recited in claim 13, wherein the threaded spindle is movably engaged with the screw nut via a roller set.

15. The system as recited in claim 13, wherein the internal thread of the screw nut has a helix angle which provides self-locking such that the actuating element is not moved by axial forces acting on the actuating element when power is not supplied to the torque motor.

16. The system as recited in claim 10, wherein the hollow shaft is formed by a wall having a thickness, in a zone of engagement with the torque motor, of at least one third the diameter of the threaded spindle.

17. The system as recited in claim 10, wherein the hollow shaft surrounds the screw nut along an axial extent of the hollow shaft, the axial extent being at least as great as the length of the screw nut.

\* \* \* \* \*